US010958522B1

(12) United States Patent
Willett et al.

(10) Patent No.: US 10,958,522 B1
(45) Date of Patent: Mar. 23, 2021

(54) CONFIGURATION TRACKING PERIMETER

(71) Applicant: Amazon Technologies, Inc., Seattle, WA (US)

(72) Inventors: Dallas Lamont Willett, Albuquerque, NM (US); Jeremiah C. Wilton, Seattle, WA (US); Mostafa Ead, Vancouver (CA); Ming Che Lee, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/581,025

(22) Filed: Sep. 24, 2019

(51) Int. Cl.
*H04L 12/00* (2006.01)
*H04L 12/24* (2006.01)

(52) U.S. Cl.
CPC ...... *H04L 41/0853* (2013.01); *H04L 41/0859* (2013.01); *H04L 41/0893* (2013.01)

(58) Field of Classification Search
CPC ............. H04L 41/0853; H04L 41/0859; H04L 41/0893
USPC .................................................. 709/220, 221
See application file for complete search history.

(56) References Cited

U.S. PATENT DOCUMENTS

| | | | |
|---|---|---|---|
| 6,704,752 B1 * | 3/2004 | Kathail | H04L 41/0813 |
| 8,875,118 B1 | 10/2014 | Groothius et al. | |
| 8,931,101 B2 * | 1/2015 | Baluda | H04L 63/14 |
| | | | 726/24 |
| 9,037,673 B2 * | 5/2015 | Horr | H04N 21/4424 |
| | | | 709/217 |
| 9,141,792 B2 * | 9/2015 | Baluda | G06F 21/552 |
| 9,535,833 B2 * | 1/2017 | Choi | G06F 12/0653 |
| 10,122,533 B1 | 11/2018 | Werner et al. | |
| 10,564,987 B1 | 2/2020 | Lepine et al. | |
| 2002/0045975 A1 | 4/2002 | Carr et al. | |
| 2008/0125965 A1 * | 5/2008 | Carani | G08G 1/20 |
| | | | 701/408 |
| 2008/0196107 A1 * | 8/2008 | Yip | H04L 41/5058 |
| | | | 726/27 |
| 2009/0254639 A1 * | 10/2009 | Manchester | H04W 28/18 |
| | | | 709/220 |
| 2010/0064024 A1 * | 3/2010 | Horr | H04N 21/4586 |
| | | | 709/217 |
| 2012/0143821 A1 * | 6/2012 | Mallya | H04L 41/046 |
| | | | 707/639 |
| 2014/0095456 A1 | 4/2014 | Pidduck | |
| 2014/0137246 A1 * | 5/2014 | Baluda | G06F 21/568 |
| | | | 726/22 |
| 2014/0325194 A1 * | 10/2014 | Brindle | G06F 9/4401 |
| | | | 713/1 |
| 2015/0339127 A1 * | 11/2015 | Lee | G06F 9/44505 |
| | | | 713/1 |
| 2016/0050116 A1 * | 2/2016 | Sheshadri | H04L 41/0813 |
| | | | 709/221 |

(Continued)

*Primary Examiner* — Frantz Coby
(74) *Attorney, Agent, or Firm* — Davis Wright Tremaine LLP

(57) ABSTRACT

A configuration management system tracks the configuration of a computing environment based on a tracking policy. The configuration management system detects a change to a configuration setting included in the tracking policy, and classifies the change. The classification is indicative of an effect of the change on an ability to manage operation of the computing environment. The configuration management system initiates an action, based at least in part on the classification, in response to the change.

20 Claims, 15 Drawing Sheets

(56) References Cited

U.S. PATENT DOCUMENTS

| | | | |
|---|---|---|---|
| 2017/0235622 A1* | 8/2017 | Boyapalle | G06F 11/3409 |
| | | | 714/47.2 |
| 2017/0357232 A1* | 12/2017 | Nikhra | G05B 19/0428 |
| 2018/0004381 A1* | 1/2018 | Corsini | G06Q 10/067 |
| 2019/0095263 A1 | 3/2019 | Lahav et al. | |
| 2019/0102085 A1* | 4/2019 | Yang | G06F 3/0647 |
| 2019/0250910 A1* | 8/2019 | Yu | G06F 8/60 |
| 2019/0317786 A1 | 10/2019 | Sun | |
| 2019/0342296 A1* | 11/2019 | Anandam | H04L 41/0813 |
| 2019/0342338 A1* | 11/2019 | Anandam | H04L 63/101 |

\* cited by examiner

CONFIGURATION TRACKING PERIMETER

CROSS-REFERENCE TO RELATED APPLICATIONS

This application incorporates by reference for all purposes the full disclosures of co-pending U.S. patent application Ser. No. 16/581,038 filed concurrently herewith, entitled "CONFIGURATION CHANGE TRACKING WITH MULTIPLE MANIFESTS", and co-pending U.S. patent application Ser. No. 16/581,049 filed concurrently herewith, entitled "CONFIGURATION CHANGE TRACKING".

BACKGROUND

The operation of a computing system is typically influenced by various configuration settings. A diverse selection of such settings is typically available. Examples include, but are not limited to, settings related to security, performance tuning, application options, and so on. The management of such settings is often a complex task, particularly where two or more parties may independently make changes to the same system.

BRIEF DESCRIPTION OF THE DRAWINGS

Various techniques will be described with reference to the drawings, in which.

DETAILED DESCRIPTION

Figure 1:
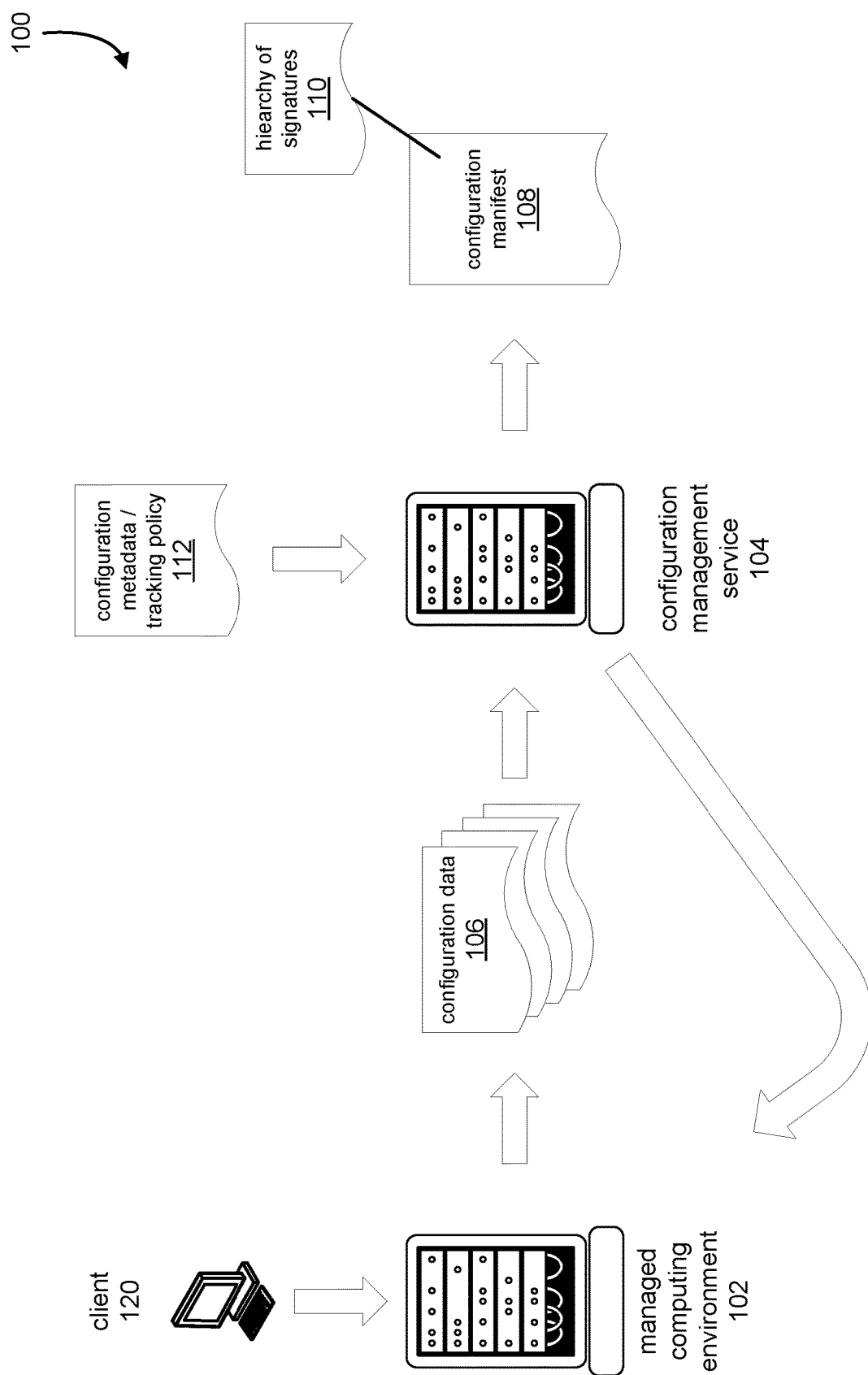
FIG. 1 illustrates an example of a managed computing environment and configuration service, in accordance with at least one embodiment.

Disclosed herein are techniques for identifying and responding to changes to the configuration of a computing system. The disclosed techniques may be applied to managed computing environments in which at least some control over the configuration of the environment is retained by a provider of the environment, and at least some control over the configuration of the environment is also provided to the client.

In an example embodiment, a tracking policy is defined. The tracking policy may include metadata, instructions, and other data. A configuration management service uses the tracking policy to map configuration data, taken from a computing environment, to a hierarchy of configuration items. The configuration items in the hierarchy may be associated with various properties, such as information indicating an expected amount of dynamism in the configuration item, and an indication of the item's relevance to the tracking policy. The configuration management service uses the hierarchy and the properties to generate a signature that represents the hierarchy of configuration items, such that the configuration management service detects subsequent changes to the configuration based on a change to the signature.

In an example embodiment, a configuration management service generates a manifest to represent a hierarchy of configuration items. The manifest comprises entries stored or accessible in a hierarchical fashion. The leaf-level entries may each represent a configuration item, and may include a value for the configuration item, and additional properties such as an indication of the item's dynamism and relevance to a tracking policy. The configuration management service may also store a signature based on the configuration setting with the item. An interior-level or root-level entry may comprise a combination of signatures computed from the signatures of the node's children. A signature at the root-level of the hierarchy represents the entire hierarchy, so that any change to a configuration item is ultimately reflected in a signature at the root. The configuration management service drills down through the hierarchy, guided by comparison of signatures at each node level, to locate a changed configuration setting.

In at least one embodiment, a tracking policy defines a hierarchy of configuration items. A configuration management service tracks the configuration of a computing environment in accordance with the tracking policy. In particular, in the example embodiment, the configuration management service generates a configuration manifest based on the policy. The service detects changes to the configuration of the computing environment based on a change to the signature of the manifest. When an updated version of the tracking policy is received, the configuration management service continues to track the configuration of the computing environment in accordance with the original version of the tracking policy. This continues at least until a complete manifest has been generated in accordance with the new version of the tracking policy. If a change is detected, it may be verified against the updated tracking policy and a notification may be sent. The configuration management service may switch to tracking based entirely on the new policy once the manifest has been fully generated, based on the updated tracking policy, at least once.

In at least one embodiment, a configuration tracking policy defines a support perimeter. A configuration management service tracks the configuration of a computing environment in accordance with the configuration tracking policy. When a change is detected, the service classifies the change based on its predicted impact on the supportability of the computing environment. For example, the change may be classified as beneficial, inconsequential, impacting performance, negative, or unsupported. Based on this classification, the configuration management service can determine whether the current configuration of the computing environment is inside or outside of the support perimeter defined by the tracking policy. The configuration management service may also respond to the change, and classification thereof, by initiating an action to bring the configuration of the computing environment back within the defined support perimeter.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of a managed computing environment and configuration service, in accordance with at least one embodiment. In the example 100, the configuration of a managed computing environment 102 is managed by a configuration service 104.

Figure 15:
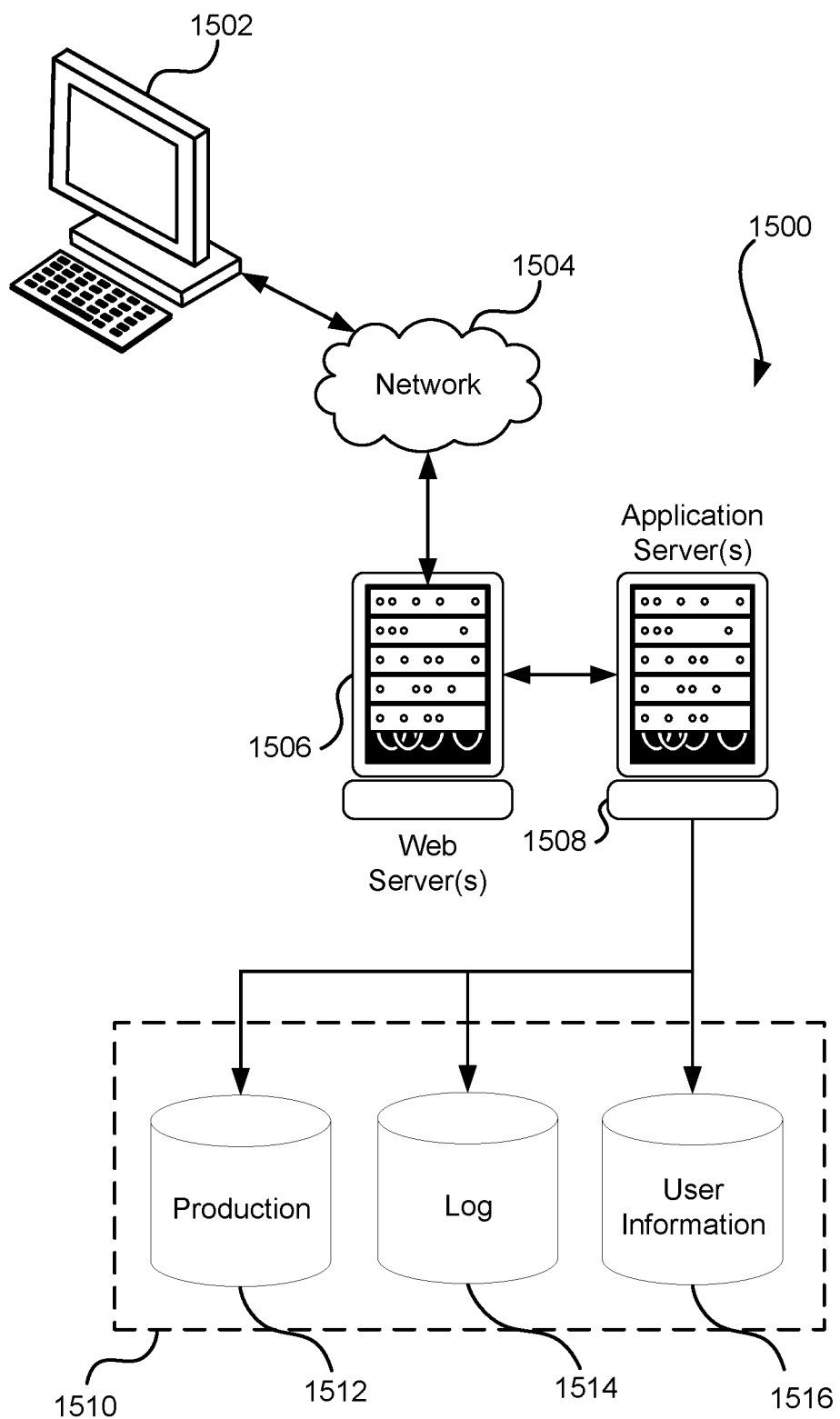
FIG. 15 illustrates a system in which various embodiments can be implemented.

A managed computing environment, in at least one embodiment, comprises one or more computing devices or computing systems, such as the web servers, application servers, and/or database servers depicted in FIG. 15. A managed computing environment may also include, in at least one embodiment, one or more additional devices such as storage devices, networking components, and so on. A managed computing environment may also correspond to a single computing device, such as a personal computer, smartphone, tablet, and so forth.

The operation of the managed computing environment 102, in at least one embodiment, is managed by a service provider on behalf of a client 120. The operation of the managed computing environment 102 can include the execution of various systems and application programs, such as database management systems, data analytics services, web services, business objects, and so forth. It will be appreciated that these examples are intended to be illustrative rather than limiting, and that, as such, the examples should not be construed in a manner which would limit the scope of the present disclosure to only those embodiments which include the specific examples provided.

The client 120 is permitted at least partial control over the configuration of the managed computing environment 102. As such, various configuration settings may be changed independently by the client 102. The settings subject to change may include those related to application programs, databases, operating systems, and so on. It will be appreciated that these examples are intended to be illustrative rather than limiting, and that, as such, the examples should not be construed in a manner which would limit the scope of the present disclosure to only those embodiments which include the specific examples provided.

In at least one embodiment, a configuration of the managed computing environment 102 is monitored by the configuration service 104. The configuration management service 104 obtains configuration data 106 concerning the managed computing environment 102. Based on this data 106, and on configuration metadata 112, the configuration management service 104 generates a configuration hierarchy to represent selected aspects of the configuration data. The configuration hierarchy may be stored in a configuration manifest 108.

The manifest 108, in at least one embodiment, comprises a hierarchy of signatures 110, such as a hierarchy of hash values, which represent selected aspects of the configuration data 106. The leaf nodes of the hierarchy correspond to signatures, e.g., hashes, of a configuration item obtained from the configuration data 106. The parents of the leaf nodes represent combinations of these values, and so on up to the root node of the hierarchy. The root-level signature value may be described as "global," in the sense that it is representative of the signatures underneath it in the hierarchy. Thus, any change to a global signature indicates that, somewhere within its hierarchy, a configuration item has been changed. A drill-down process may be employed to identify which configuration item has changed.

The configuration manifest 108, and any corresponding signature hierarchies, in at least one embodiment, are based at least in part on configuration metadata 112. This metadata describes the configuration data 106, so that various configuration items can be obtained from it and mapped to a location in the configuration hierarchy. The configuration metadata 112, in at least one embodiment, also comprises data indicating the relevance and dynamism of various configuration items. For example, the metadata 112 may indicate that a configuration items is expected to change, or that a configuration item is of low relevance.

In at least one embodiment, the metadata is a component of a tracking policy. As used herein, a tracking policy refers to computer-readable instructions that facilitate detecting configuration changes relevant to the policy. For example, in at least one embodiment, a tracking policy comprises information describing the dynamism and relevance of various configuration items. For example, a tracking policy might indicate that the number of storage devices attached to a host is relevant to a tracking policy, and that the number of attached storage devices can be expected to vary over time. The tracking policy might further indicate that upwards revisions of the number are of no concern, but that downward revisions are to trigger a notification.

In at least one embodiment, the configuration of the managed computing environment 102 is at least partially maintained by the configuration management service 104. The maintenance of the configuration may involve corrective or compensatory actions taken in response to a change to a configuration item.

In at least one embodiment, the configuration management service 104 monitors the managed computing environment 102 to determine if its configuration lies within a support perimeter, and in the event of an excursion beyond the perimeter, to initiate an action to bring the environment back within the perimeter. The support perimeter may be defined by a tracking policy. Here, the term support perimeter refers to a range of configuration settings, within which the managed computing environment 102 can be effectively managed. For example, a service level agreement ("SLA") might be conditioned on the managed computing environment 102 being within the support perimeter.

Figure 2:
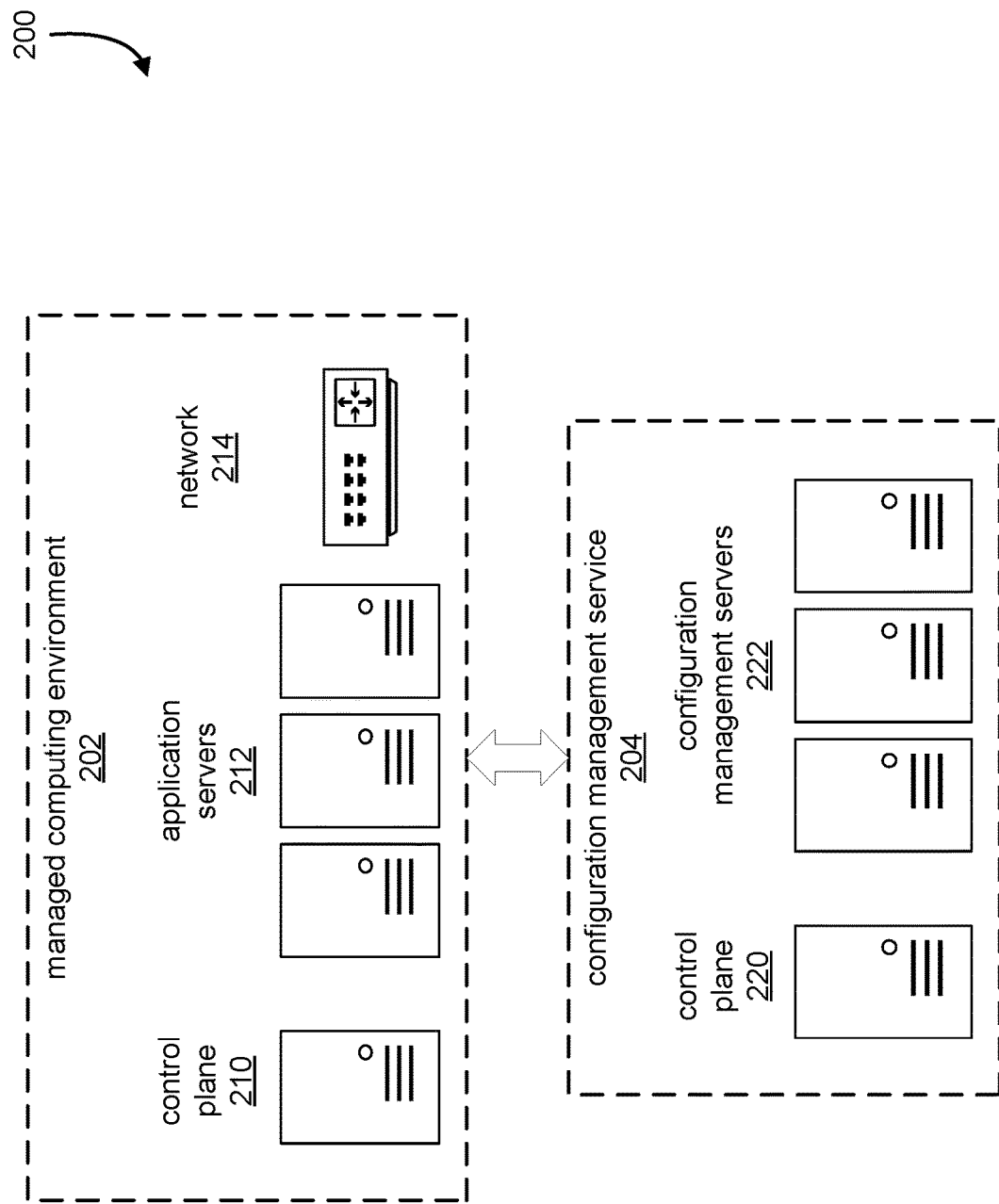
FIG. 2 illustrates further aspects of a managed computing environment and configuration service, in accordance with at least one embodiment.

FIG. 2 illustrates further aspects of a managed computing environment and configuration service, in accordance with at least one embodiment. The managed computing environment 202 and configuration management service 204 may correspond to the managed computing environment 102 and configuration management service 104 that FIG. 1 depicts.

In the example 200, the managed computing environment 202 comprises one or more application servers 212 and a network 214. The application servers 212 or network 214 may be similar to those depicted in FIG. 15. It will be appreciated that these examples are intended to be illustrative of components that may be included in a managed computing environment, rather than limiting, and that as such the examples should not be construed in a manner which would limit the scope of the present disclosure to only those embodiments which include the specific examples provided. For example, various other components, such as web servers, storage area networks, and so forth, may also be included in the managed computing environment.

The managed computing environment 202, in at least one embodiment, further comprises a control plane 210. The control plane 210, which may be implemented on a computing device such as one or more of the servers depicted in FIG. 15, provides configuration management capabilities regarding management of the application servers 212 and network 214. For example, the control plane 210 might execute workflows for installing application software on the application servers 212, configuring settings of the network 214, and so forth. The control plane 210 may, in some cases and embodiments, receive instructions from the configuration management service 204. These instructions may include instructions to configure one of the application servers 212 or the network 214. The control plane 210 might also receive instructions to collect configuration data from one of the application servers 212 or network 214.

The configuration management service 204, in at least one embodiment, comprises a control plane 220 and one or more configuration management servers 222. The control plane 220 and configuration management servers 222 may correspond to the servers depicted in FIG. 15.

Within the configuration management service 204, the control plane 220 manages workload of the configuration service, such as bringing additional configuration management servers 222 online. The configuration management servers 222 may each perform a variety of functions. These functions include, in at least one embodiment, receiving configuration data from the managed computing environment, mapping configuration items in the configuration data to a configuration hierarchy, calculating configuration signatures, and so forth.

In at least one embodiment, the configuration management servers may also identify changes to the configuration of the managed computing environment 202 and initiate a notification or corrective action when the configuration moves outside of a support perimeter.

Figure 3:
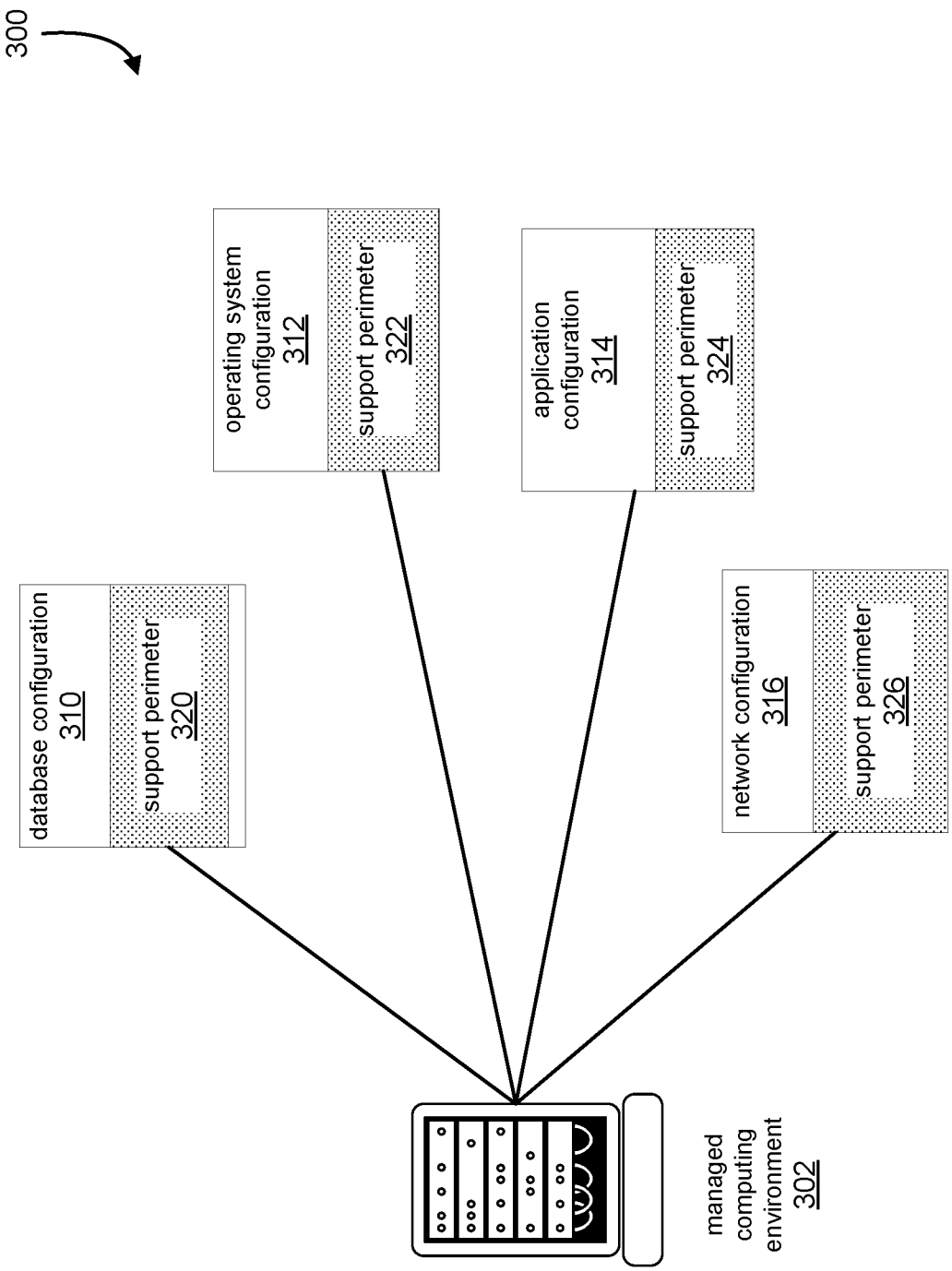
FIG. 3 illustrates configuration data and support perimeters associated with a managed computing environment, in accordance with at least one embodiment.

FIG. 3 illustrates configuration data and support perimeters associated with a managed computing environment, in accordance with at least one embodiment. In the example 300, a managed computing environment is associated with a variety of configuration data, including data related to database configuration 310, operating system configuration 312, application configuration 314, and network configuration 316. The configuration data may, in cases and embodiments, be obtained from various devices and storage locations within the managed computing environment 302. For example, database configuration 310 might be obtained from configuration files, schema catalogues, and so forth. Likewise, operating system configuration 312 might be obtained from a system registry or initialization file. It will be appreciated that these examples are intended to be illustrative rather than limiting, and that as such the examples should not be construed in a manner which would limit the scope of the present disclosure to only those embodiments which include the specific examples provided.

The example 300 further illustrates that portions of the configuration are associated with a support perimeter 320-326. For example, certain aspects of application configuration 314 are associated with a corresponding support perimeter 324. Likewise, some network configuration 316 settings might be associated with a support perimeter 326, while other settings might be excluded from this association. Note that here, association between a configuration item and a support perimeter refers to the configuration item being monitored for its compliance with the perimeter.

Figure 4:
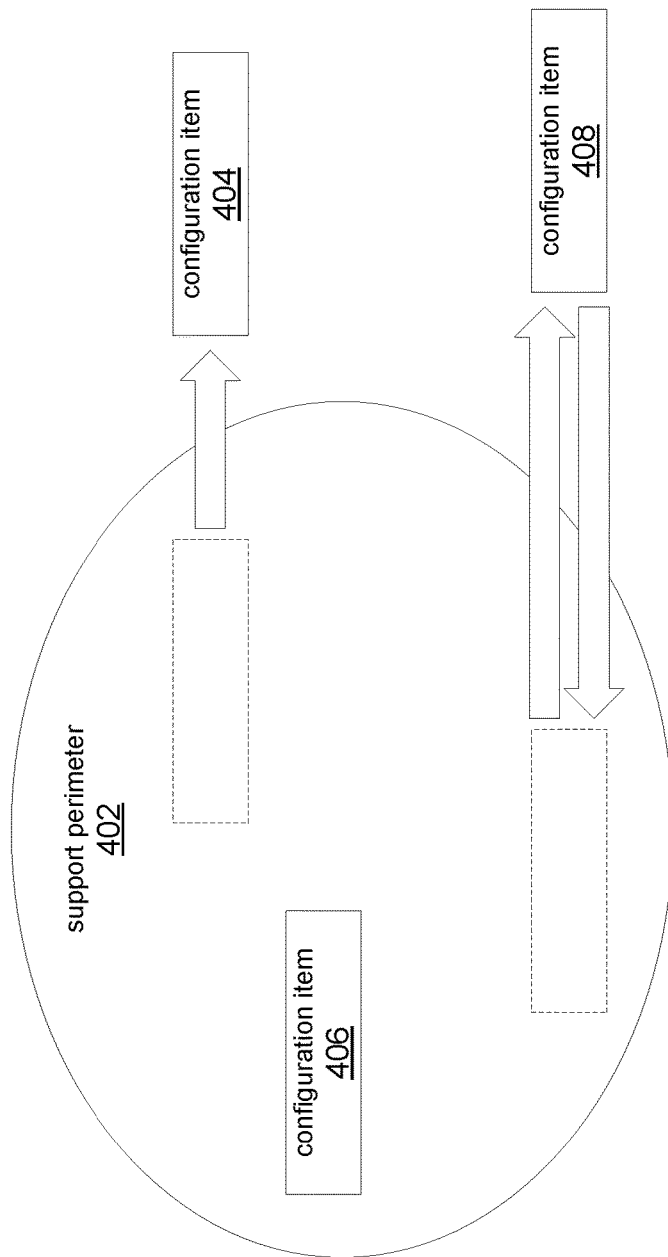
FIG. 4 illustrates tracking configuration items with respect to a support perimeter, in accordance with at least one embodiment.

Support perimeters may be further understood in view of FIG. 4, which illustrates tracking configuration items with respect to a support perimeter, in accordance with at least one embodiment. The example 400 depicts a support perimeter 402 which is associated with configuration items 404-408. The configuration items 404-408 associated with the support perimeter 402 might be those defined to be relevant to a tracking policy. The tracking policy might further define acceptable ranges or values for those configuration items. A configuration item, such as the depicted configuration item 406, is deemed to be within the support perimeter 402 when the value of the configuration item 406 is within an acceptable range. Likewise, a configuration item 404 whose value is not within an acceptable range is deemed to be outside of the support perimeter 402.

In at least one embodiment, a configuration management service, such as the configuration management services depicted in FIGS. 1 and 2, monitors configuration items to determine if their current settings are within or outside of the support perimeter 402. Moreover, in at least one embodiment, the configuration management service initiates a corrective action to move the configuration item back within the support perimeter 402. For example, as depicted in FIG. 4, a configuration item 408 might initially have a setting that conforms to the support perimeter 402. However, a configuration action, such as one that might be performed by the client 120 in FIG. 1, might cause the configuration item 408 to move outside the support perimeter 402. The configuration management service may detect this change and initiate a configuration action to correct it.

Figure 5:
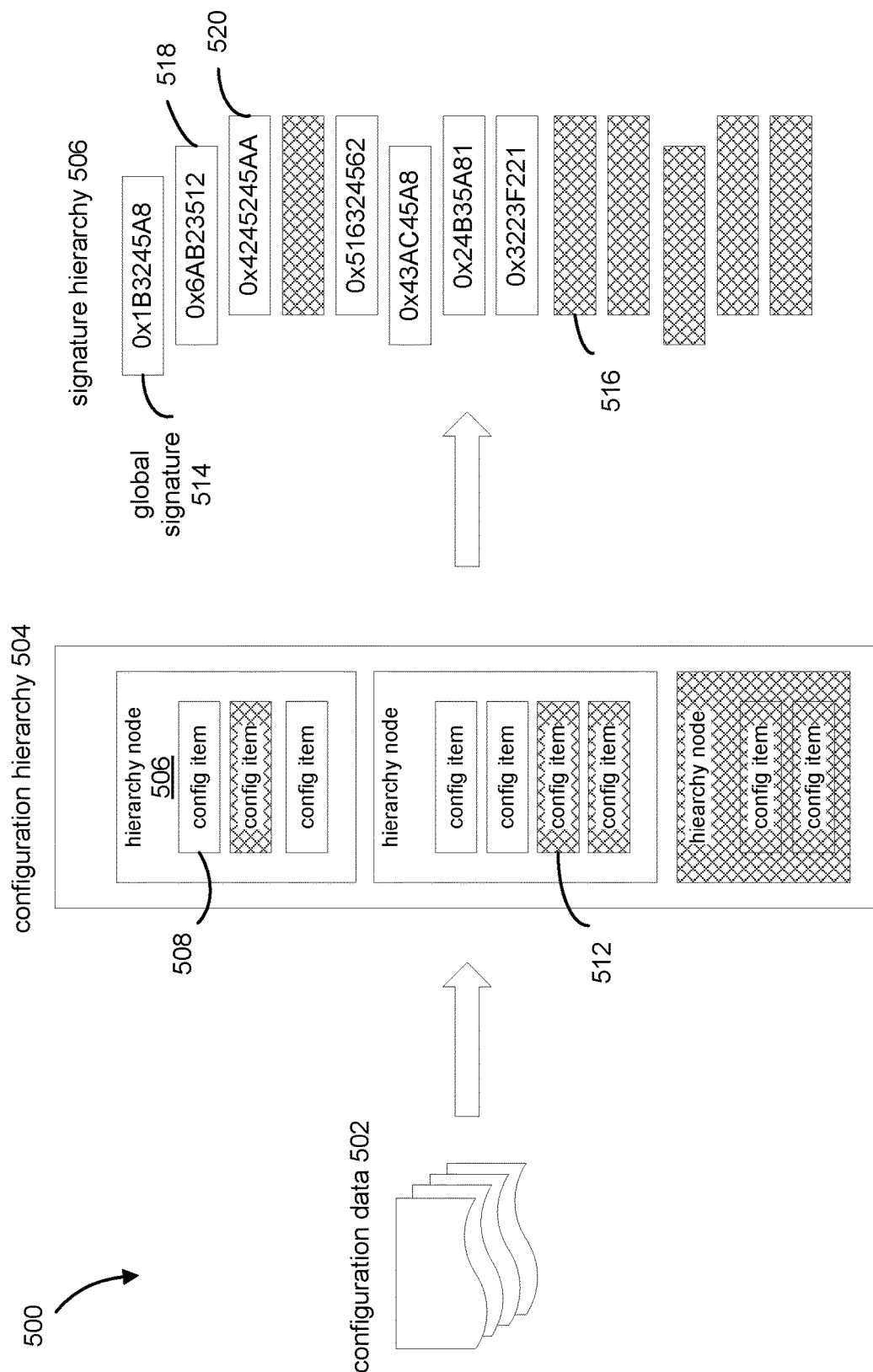
FIG. 5 illustrates an example of mapping configuration items to a configuration hierarchy and generating configuration signatures, in accordance with at least one embodiment.

FIG. 5 illustrates an example of mapping configuration items to a configuration hierarchy and generating configuration signatures, in accordance with at least one embodiment. In the example 500, configuration data 502 is mapped to a configuration hierarchy 504. The mapping, which may be defined by configuration metadata and/or a tracking policy, organizes the configuration items from the configuration data 502 into a hierarchy comprising a logical structuring of the configuration information. For example, a node of the hierarchy, such as the depicted hierarchy node 506, might contain configuration items related to a particular database, application program, or computing device. It will be appreciated that these examples are intended to be illustrative rather than limiting, and that, as such, the examples should not be construed in a manner which would limit the scope of the present disclosure to only those embodiments which include the specific examples provided. By grouping related configuration items together, a configuration management service is better able to locate, classify, and respond to configuration changes.

In at least one embodiment, certain configurations are associated, during the mapping process, with additional information such as various indications of a configuration items relevance. For example, certain configuration items, such as the depicted configuration item 508, may be indicated as relevant to a tracking policy, while others, such as the depicted configuration item 512, may be indicated as not relevant to the tracking policy.

In at least one embodiment, mapping configuration items to a configuration hierarchy 504 comprises storing the configuration items, e.g., as name-value pairs, in a manifest. A configuration item may be stored in the manifest along with data indicating one or more tracking policies to which the configuration item is relevant.

In at least one embodiment, the configuration management service generates a hierarchy of configuration signatures 506 which parallels the structure of the configuration hierarchy 504. A signature 520 is generated from a configuration item, rolled-up into an intermediate-level signature 518, and rolled-up again to a root-level or global signature 514.

The configuration management service may excluded, from the hierarchy of global signatures 506, the signature 516 of a configuration item 512 that is deemed to not be applicable to the tracking policy. The global signature 514 may therefore be made to represent configuration items deemed relevant to a given tracking policy.

In at least one embodiment, the configuration hierarchy 504 includes configuration items relevant to a plurality of tracking policies, so that a number of different signature hierarchies may be generated from it, each according to a different tracking policy.

In at least one embodiment, the configuration hierarchy 504 is generated using a cryptographic salt. A cryptographic salt is a randomly generated value used as an input to a hash function, or other function, used to generate the signature hierarchy 506. The use of a salt value may help to avoid reverse-engineering of configuration settings based on the signature values. To facilitate comparison between two or more signature hierarchies, each of the two or more signature hierarchies may be generated using a common salt value.

Figure 6:
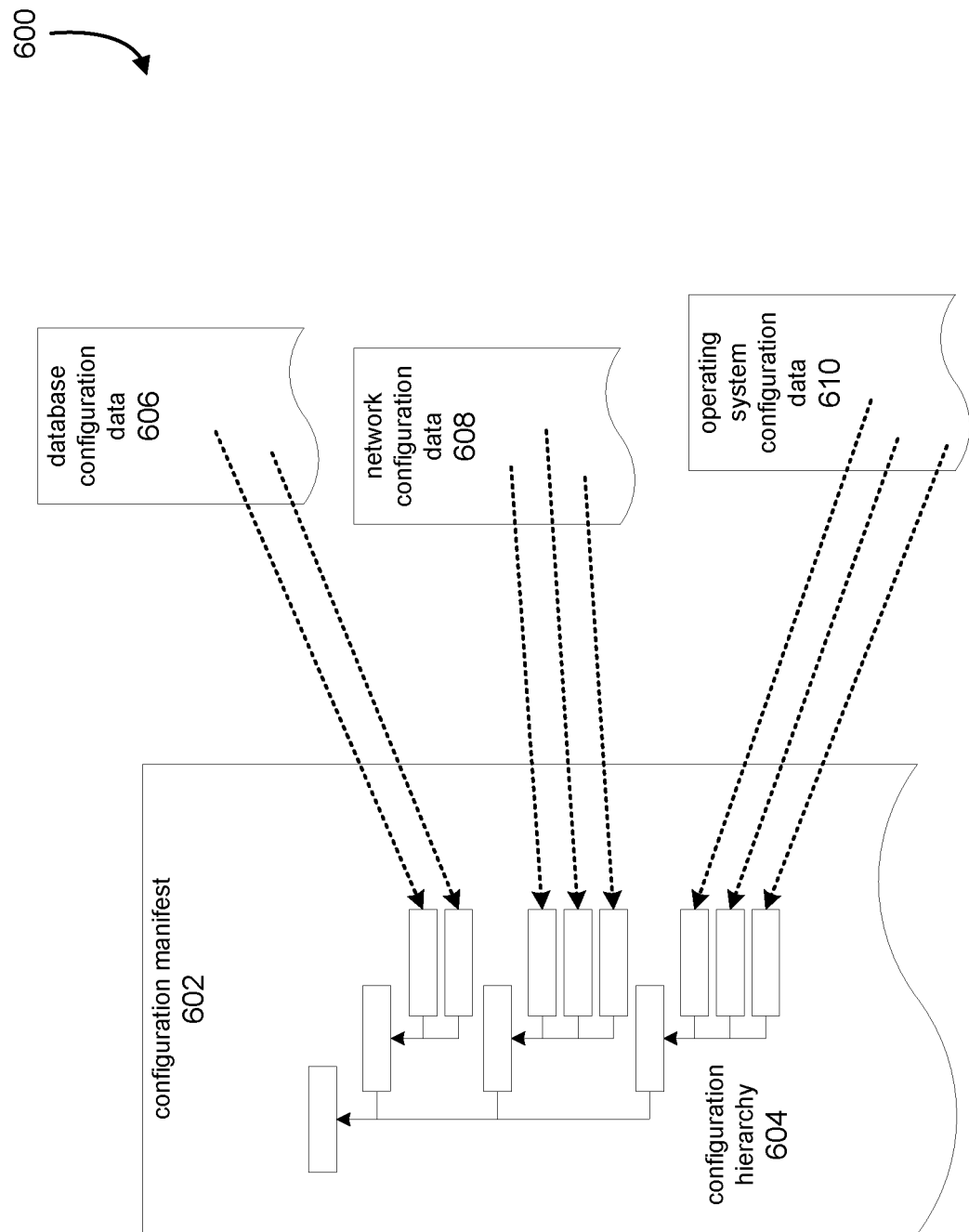
FIG. 6 illustrates an example of a configuration manifest, in accordance with at least one embodiment.

A configuration manifest may be further understood in view of FIG. 6, which illustrates an example of a configuration manifest, in accordance with at least one embodiment. A configuration manifest 602 may represent a configuration hierarchy 604. Various aspects of the configuration of a computing device or environment, such as the managed computing environment depicted in FIG. 1, may be mapped to the hierarchy. In at least one embodiment, the configuration hierarchy 604 is stored in the manifest 602. This may also include corresponding signatures. Various data formats, such as extended markup language ("XML"), may be used to represent the manifest.

In the example 600 of FIG. 6, these aspects include configuration items extracted from database configuration data 606, network configuration data 608, and operation system configuration data 610. It will be appreciated that these examples are intended to be illustrative rather than limiting, and that, as such, the examples should not be construed in a manner that would limit the scope of the present disclosure to only those embodiments that include the specific examples provided.

As illustrated by the example 600, configuration items from the configuration data 606-610 are mapped to leaf-level elements in the configuration hierarchy 604. These leaf-level elements may be further grouped into one or more levels of interior nodes, and a root-level node.

A configuration manifest 602, in at least one embodiment, comprises a plurality of configuration hierarchies 604, or a single hierarchy from which multiple sub-hierarchies may be extracted.

Figure 7:
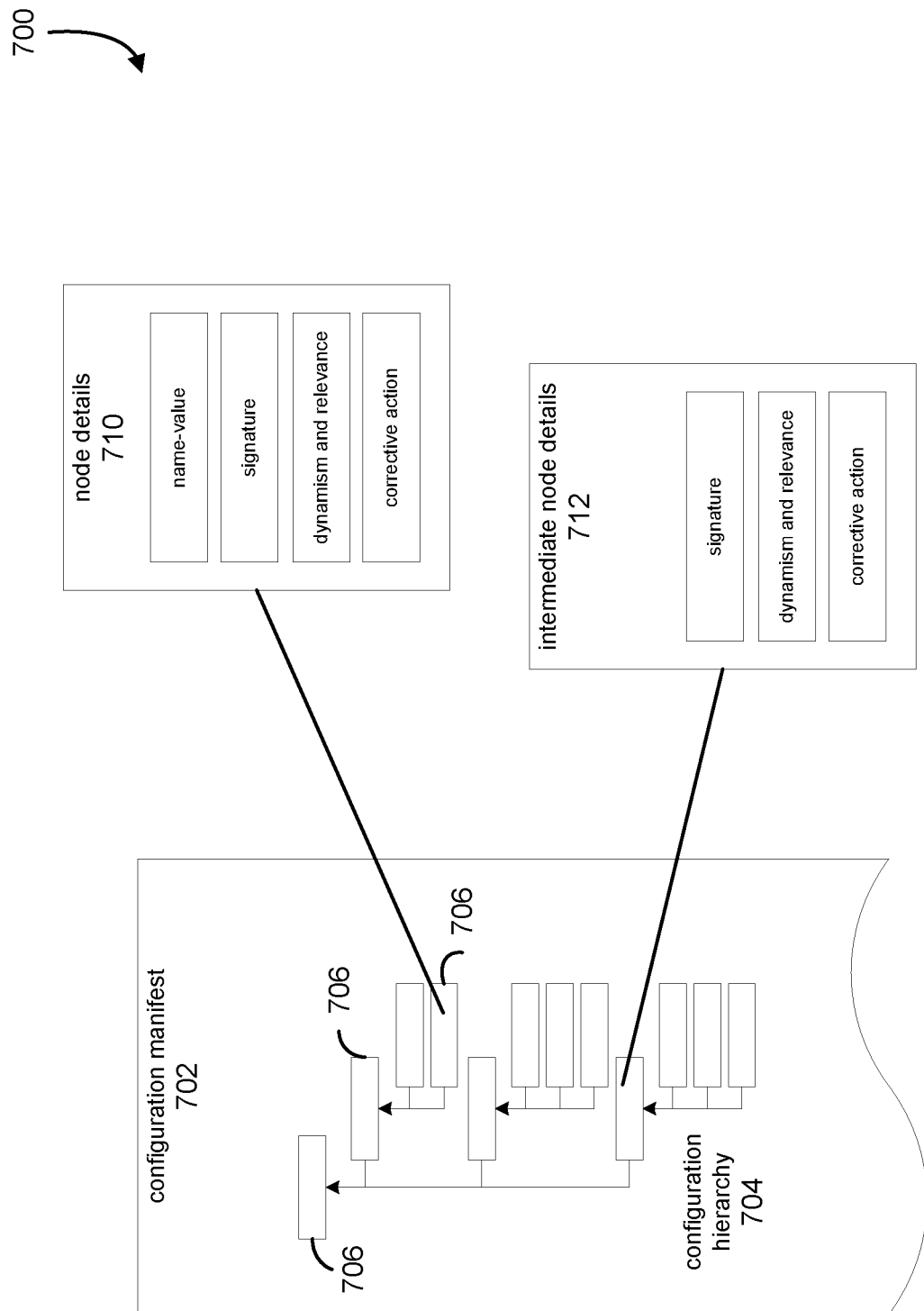
FIG. 7 illustrates further aspects of an example of a configuration manifest, in accordance with at least one embodiment.

FIG. 7 illustrates further aspects of an example of a configuration manifest, in accordance with at least one embodiment. In the example 700, the manifest 702 may correspond to the manifest depicted in FIG. 6, and comprises a representation of a configuration hierarchy 704 comparable to the one depicted in FIG. 6.

The example 700 depicts that the configuration hierarchy stored within the manifest 702 may comprise a stored representation of a configuration hierarchy 704. The configuration hierarchy comprises a plurality of nodes 706, arranged in a hierarchical fashion. Each node may comprise additional information about the configuration item, or items, that it corresponds to. For example, the node details 710 for a leaf-level node might comprise the name of the configuration item, its current value and a signature based at least in part on the current value. The node details 710 might further comprise information about the dynamism and relevance of the configuration item to a configuration tracking policy, and information describing corrective actions that may be taken should the configuration item deviate from a support perimeter. Likewise, the details 712 for an interior node might comprise a signature based at least partly on the interior nodes child nodes, information indicating the dynamism and relevance of the child nodes to a tracking policy, and information describing possible corrective actions.

The signatures in the hierarchy may be computed, at the root level, by taking a hash of the value of the configuration setting. Alternatively, in an embodiment, the hash is taken on a concatenation of the name of the setting and its value. At the intermediate levels, the signatures may be combined using various techniques.

Figure 8:
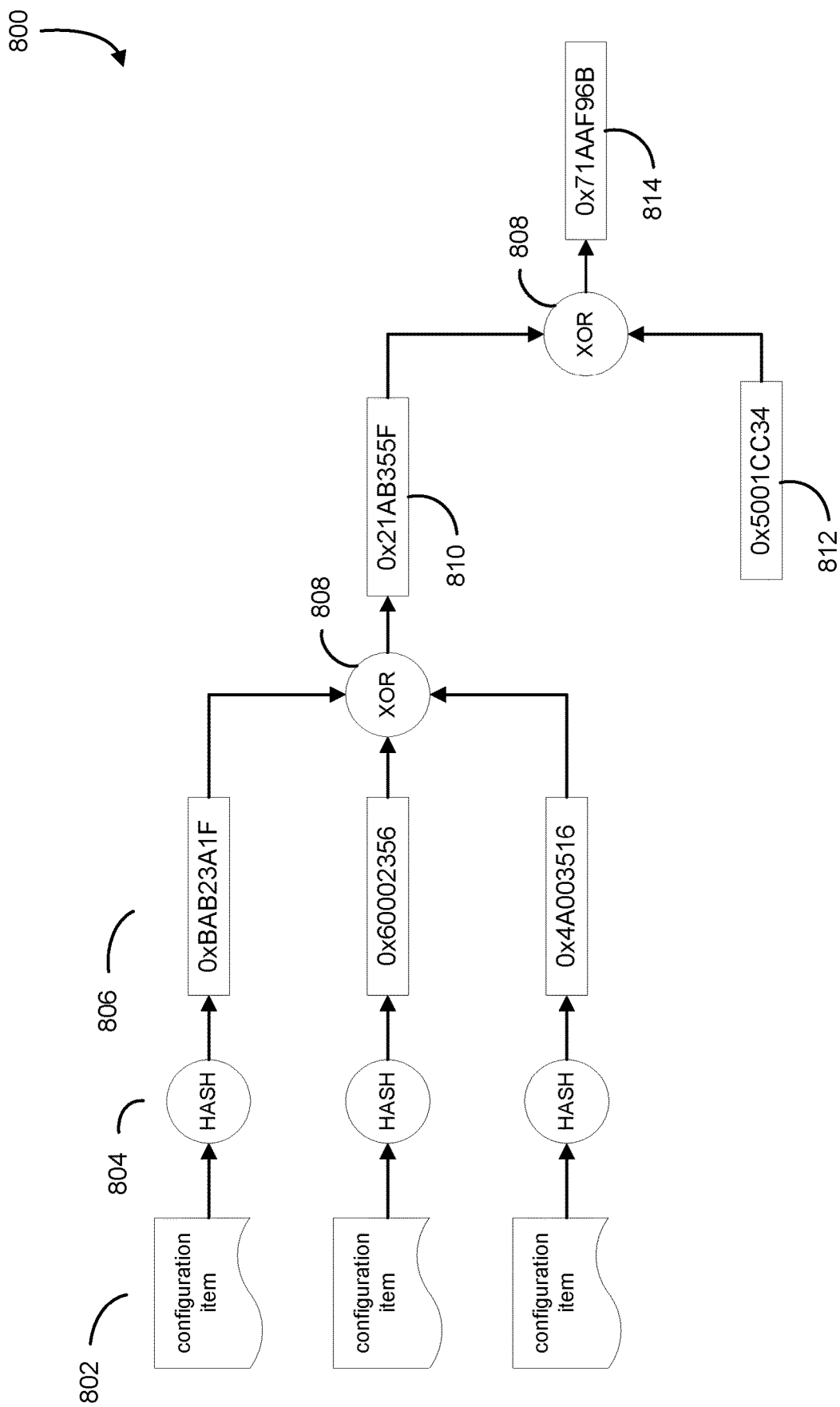
FIG. 8 illustrates generation of a configuration signature, in accordance with at least one embodiment.

This may be further understood in view of FIG. 8, which illustrates generation of a configuration signature, in accordance with at least one embodiment. As depicted in the example 800, a hash operator 804 may be applied to a configuration item 802 to generate a hash value 806. The hash values 806 correspond to those at the leaf level of the configuration hierarchy.

In at least one embodiment, the hash values 806 are combined via an exclusive-or ("XOR") operator 808, to generate a signature 810 for an intermediate level of the configuration hierarchy. A similar operation may be performed, using other hash values, to generate a signature 812 for another intermediate-level node. These may be further combined using an XOR operator 808 to generate a top-level, or global, signature 814.

Figure 9:
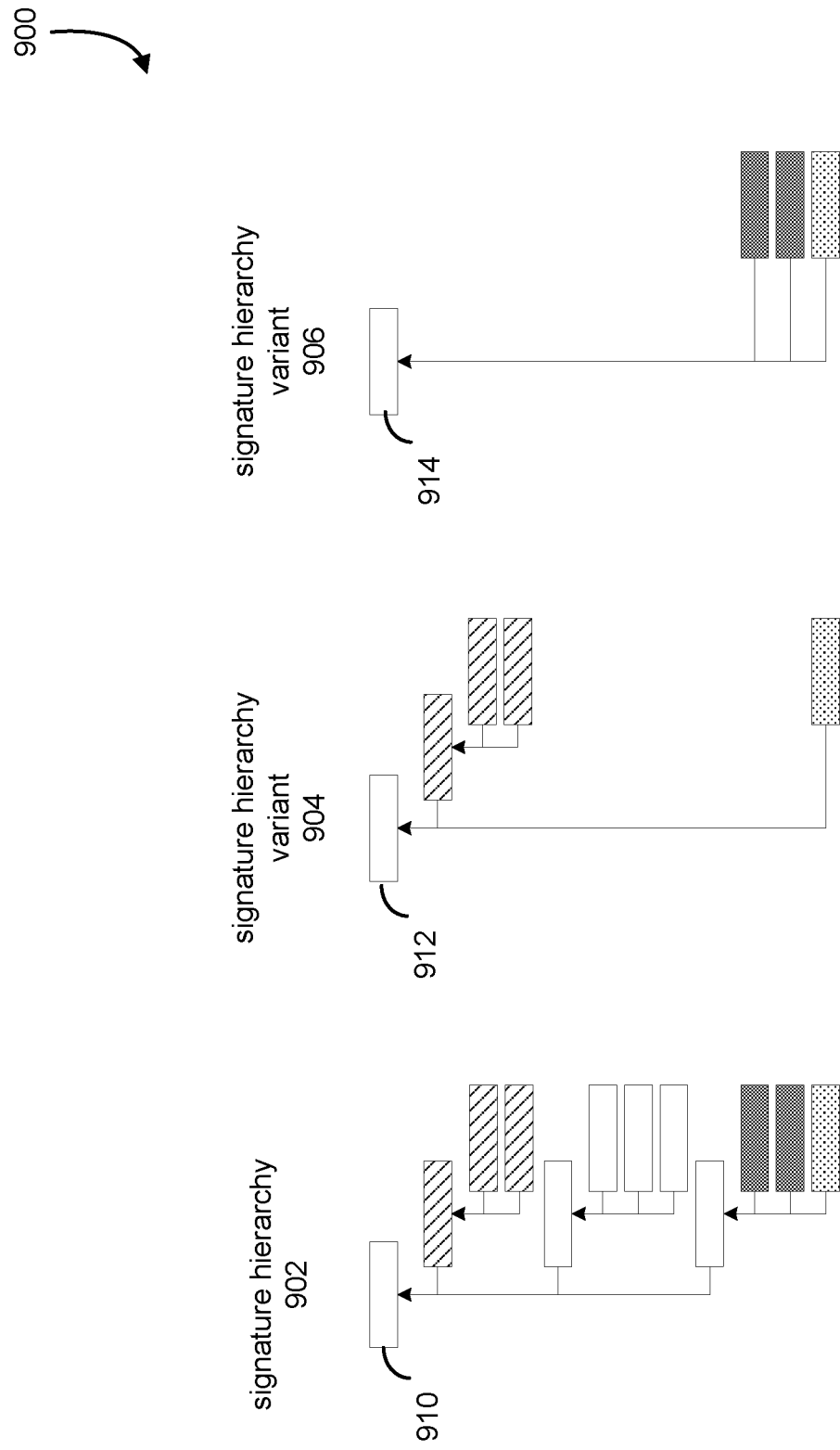
FIG. 9 illustrates examples of configuration hierarchies generated based on variants of a configuration manifest, in accordance with at least one embodiment.

In at least one embodiment, a number of signature hierarchies may be derived from the information included in a single manifest. FIG. 9 illustrates examples of signature hierarchy variants, in accordance with at least one embodiment.

In the example 900 of FIG. 9, a signature hierarchy 902 is computed based on configuration items included in a configuration manifest, as defined by a tracking policy. The tracking policy specifies various configuration items that are to be tracked, as well as information indicative of their dynamism and relevance to the tracking policy. The tracking policy further defines how the various configuration items are to be mapped to a position in a configuration hierarchy.

The configuration hierarchy, as reflected in the structure of a corresponding manifest, is used to compute the signature hierarchy 902.

In at least one embodiment, additional signature hierarchies may be computed based off of the data used to compute the signature hierarchy 902. As depicted in FIG. 9, the variant signature hierarchies 904, 906 each rely on a subset of the signatures used to compute the signature hierarchy 902. Moreover, each of the variant signature hierarchies 904 arranges the signatures in different ways.

Tracking policies are derived from this tracking policy. These additional policies rely on the same configuration items included in the configuration hierarchy 902, but may omit some items, or map them to different locations. Thus, the configuration hierarchy variants 904, 906 each include different ones of the configuration items included in the original configuration hierarchy 902.

In at least one embodiment, the additional tracking policies indicate that a given configuration item possesses different characteristics regarding dynamism or relevance. This permits the various tracking policies to adapt to different viewpoints and requirements. For example, a policy intended to monitor configuration changes over a long period of time might view the dynamism of a configuration item differently than one intended to monitor short-term changes. Similarly, different configuration items might have more or less relevance to different tracking policies.

The configuration hierarchies 902-906 may be used to generate different root-level, or global, signatures 910-914. For example, with respect to FIG. 9, the signature 910 representing the base configuration hierarchy 902 reflects all of the included configuration items. As such, if any one of the configuration items changes, the root-level signature 910 will also change. On the other hand, the variant hierarchies 904, 906 each include only a subset of the configuration items included in the original configuration hierarchy 902. Consequently, their respective signatures 912, 914 will change only if one of their respective configuration items changes.

Figure 10:
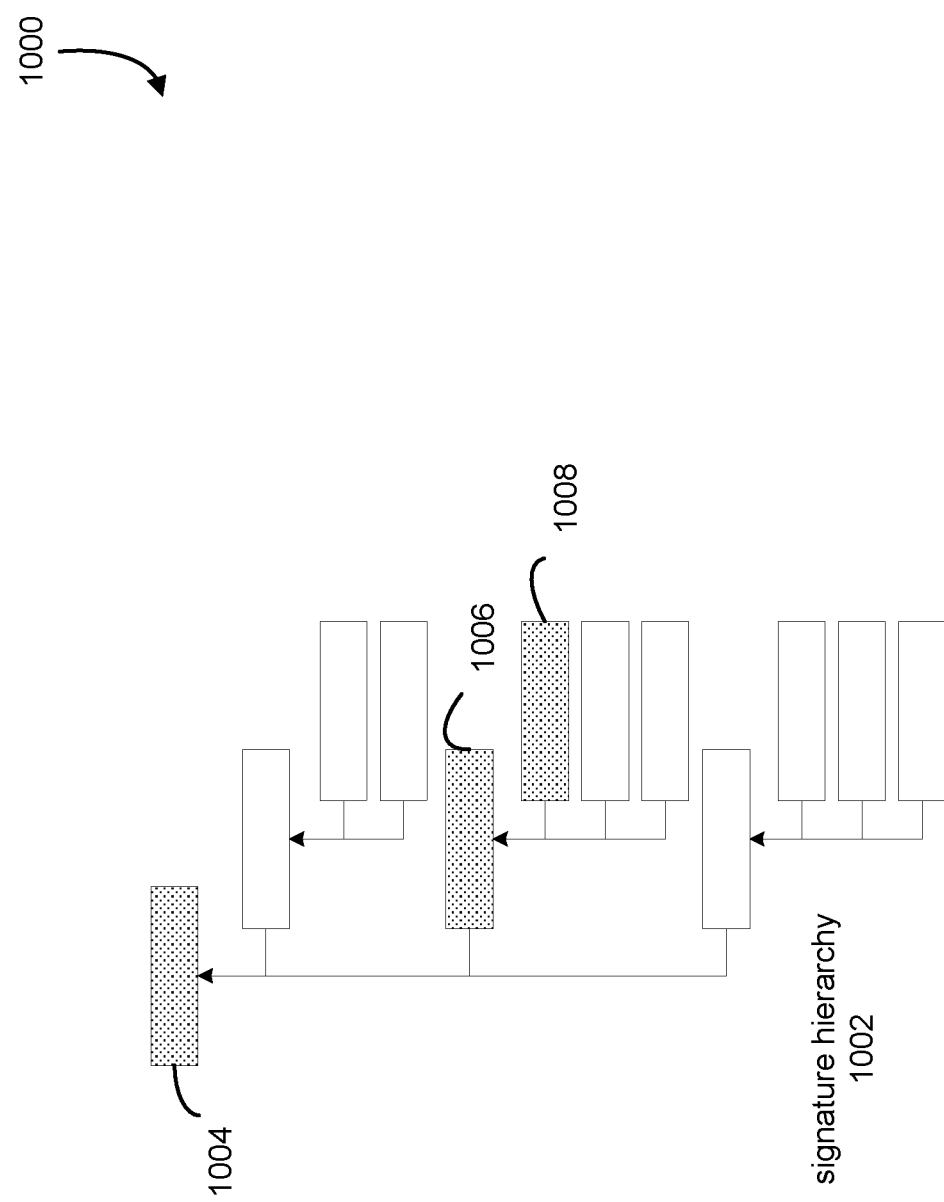
FIG. 10 illustrates locating changed configuration items, in accordance with at least one embodiment.

FIG. 10 illustrates locating changed configuration items, in accordance with at least one embodiment. The example 1000 depicts a signature hierarchy 1002. Changes to a configuration, as measured in accordance with a tracking policy, are detected by comparing copies of the signature hierarchy 1002 generated at different times. In the depicted example 1000, it is assumed for illustrative purposes that the signature contained in a leaf node 1008 has changed in the signature hierarchy 1002 over time. This would occur, for example, if the setting for the corresponding configuration item had changed. The configuration management service would obtain the new configuration setting, and calculate an updated signature. The signature calculation is determinate, in that for a given input X, it will always output Y, but will output something other than Y for an input other than X. Consequently, any change to the configuration setting would cause the value of the signature to change. Comparing a copy of the signature hierarchy 1002 computed at a time $T_n$ to a copy of the signature hierarchy 1002 computed at a time $T_{n+1}$ would reveal the change, presuming that the change to the configuration setting occurred somewhere between $T_n$ and $T_{n+1}$.

As depicted in the example 1000, the change to the leaf node 1008 is also reflected in its parent node 1006, and so on, up to the root-level signature 1004. The signatures of the root-level and intermediate nodes in the hierarchy are based on those of their respective children.

In the example 1000, the change to the configuration item represented by the leaf node 1008 is detected by first determining that the root-level signature 1004 has changed with respect to a the hierarchy 1002 computed at an earlier time. A drill-down process may then occur, in which the change to the intermediate node 1006 is identified, and then the change to the leaf node 1008.

In at least one embodiment, a set of changes relevant to a tracking policy are identified, based in part on the process just described. The tracking policy, in an example embodiment, includes indications of the dynamism and relevance of various configuration items. In at least one embodiment, a configuration management service uses this information to perform filtering or pruning during the identification process. For example, nodes expected to have high levels of dynamism may be treated as if they are unchanged. Similarly, certain items may be flagged as irrelevant and ignored during the search. In at least one embodiment, metadata may indicate that a change to a configuration item may be ignored unless changed to a specific value, or to a specific range of values. These examples may also be applied, in at least one embodiment, to configuration settings grouped under a common interior node of the signature hierarchy 1002. In at least one embodiment, criteria such as dynamism and relevance may be applied to any node in the hierarchy.

Figure 11:
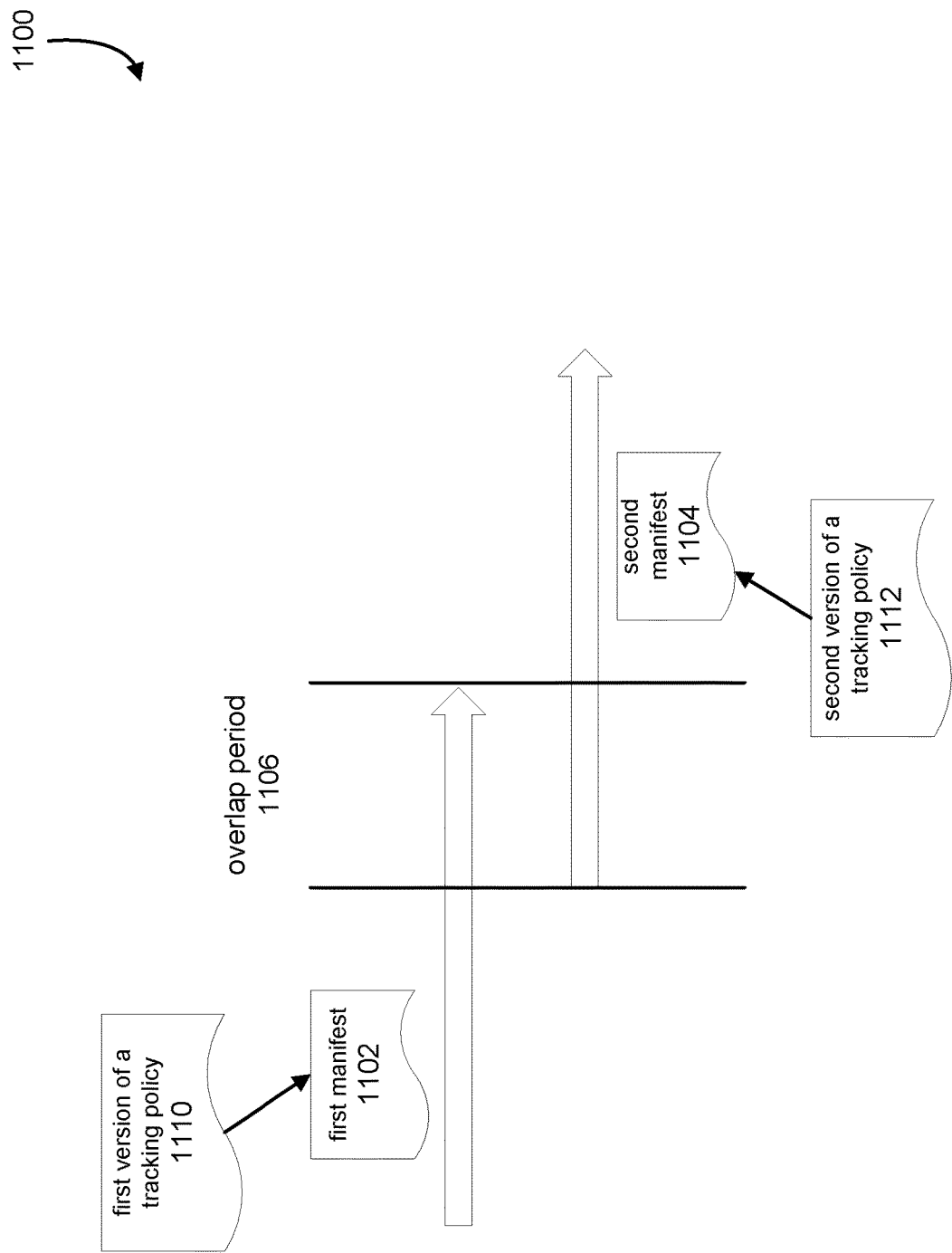
FIG. 11 illustrates configuration tracking in response to an updated tracking policy, in accordance with at least one embodiment.

The technique described above may be prone to generating false positive results when the signature hierarchy is recomputed based on different tracking policies. This may be the case even if the policies are only slightly different, since a change to a signature of a node at the leaf level of the signature hierarchy may be reflected in that node's ancestors, potentially all the way up to the root-level. A technique for addressing this difficulty is presented in FIG. 11, which illustrates configuration tracking in response to an updated tracking policy, in accordance with at least one embodiment.

In the example 1100, a first manifest 1102 is based on a first version of a tracking policy 1110. For the purpose of the example, it may be assumed that a configuration management service has received this version of the tracking policy and engaged in a process of monitoring the configuration of a managed computing environment based on that version of the policy. Then, for the purpose of the example, it may be assumed that a change is made to the tracking policy. Examples of changes that might be made include the addition of a new configuration item for tracking, the removal of an item, or the modification of an existing item. It will be appreciated that these examples are intended to be illustrative rather than limiting, and that, as such, the examples should not be construed in a manner which would limit the scope of the present disclosure to only those embodiments which include the specific examples provided.

This change, for the purpose of the example, is assumed to be reflected in the second version of the tracking policy 1112. The configuration management service receives this version of the tracking policy, and begins to generate a second manifest 1104 based on the new version of the policy.

In at least one embodiment, the configuration management service continues, for an overlap period 1106, to track the configuration of the target managed computing environment in accordance with the first tracking policy 1110. The overlap period 1106, in at least one embodiment, continues at least until tracking, in accordance with the second manifest, has been ongoing for at least one full cycle. Here, the cycle refers to the process of collecting data for an initial version of the second manifest 1104, to which manifests generated subsequently, based on the updated tracking policy, can be compared. Because the second manifest 1104 is based on an updated tracking policy, it is likely to be different than the first manifest 1102, and could generate false positives if compared to it. Accordingly, the first manifest 1102 is also updated during this period, and compared to an earlier version of itself, in order to detect potential changes. If a change is detected, it can be evaluated further with respect to the second tracking policy 1112.

Figure 12:
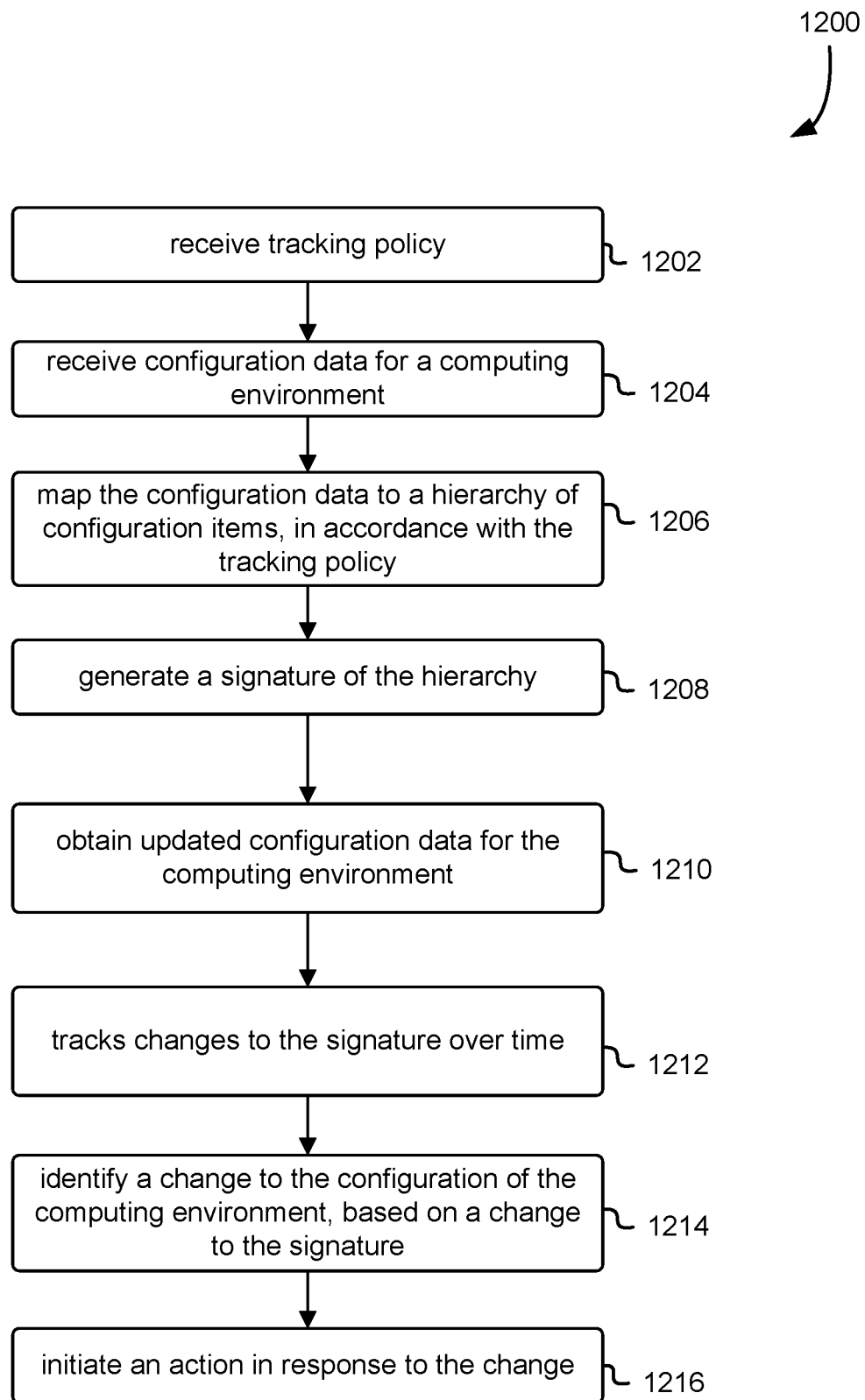
FIG. 12 illustrates tracking configuration of a computing environment in accordance with a tracking policy, in accordance with at least one embodiment.

FIG. 12 illustrates tracking configuration of a computing environment in accordance with a tracking policy, in accordance with at least one embodiment. Although FIG. 12 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 1200 that FIG. 12 depicts may be implemented on any of a variety of computing devices, such as by the configuration management service depicted in FIGS. 1 and 2.

At 1202, the configuration management service receives a tracking policy. In at least one embodiment, the tracking policy is a file comprising descriptions of various configuration items and indicating how the item would map to a location in a manifest. The file may further comprise flags indicating factors such as the dynamism or relevance of a configuration item. Note that one such file may define a number of tracking policies, in at least one embodiment.

Here, receipt of the tracking policy refers to the configuration management service obtaining access to the tracking policy. For example, in at least one embodiment, a provider of a managed computing environment, such as the managed computing environments depicted in FIG. 1, sends the tracking policy to the configuration management service, or stores the policy in a location accessible to the configuration management service.

At 1204, the configuration management service receives configuration data for the managed computing environment. The data may be received, for example, by a configuration management interface, by a file transfer facility, inter-process communication, and so on, as described in relation to FIG. 2.

At 1206, the configuration management service maps the configuration data to a hierarchy of configuration items, in accordance with the tracking policy. As described in relation to FIG. 6, the configuration data may be mapped to locations in a hierarchy. Further, as described in relation to FIG. 7, various additional data may be associated with the items, in order to provide information regarding dynamism, relevance, and potential actions that may be taken to restore the configuration item to a state within a support perimeter.

At 1208, the configuration management service generates a signature of the hierarchy of configuration items. Examples of generating a signature for a configuration hierarchy are described herein, including in relation to FIGS. 5 and 8. In at least one embodiment, the generation comprises generating hash values from leaf-node entries representing individual configuration items, and combining hash values in the interior nodes of the hierarchy up to the root-level node.

At 1210, the configuration management service obtains updated configuration data for the computing environment. For example, the configuration management service may periodically re-retrieve configuration information from the managed computing environment. A variety of retrieval strategies may be employed. For example, certain systems deemed to have greater importance may be monitored more closely than systems deemed to have lesser importance. Likewise, configuration data that is time-consuming to retrieve may be updated less often than configuration data that may be retrieved with low costs. Accordingly, the frequency of data collection may vary based on a variety of factors. As depicted with respect to FIG. 2, servers 222 in the configuration management service 204 may facilitate retrieval of the configuration data by interfacing with components of the managed computing environment 202, such as the control plane 210.

At 1212, the configuration management service tracks changes to this signature over time. The configuration management service may, for example, use the updated configuration information to update the manifest with new configuration settings, and re-calculate the signatures in the configuration hierarchy. A change to the top-level signature indicate that some aspect of the configuration has changed.

At 1214, the configuration management service identifies a change to the configuration of the managed computing environment, based on a change to the signatures generated in accordance with the tracking policy. A drill-down process can be used to search for the particular item, or items, that have changed. Moreover, since the nodes in the tree may be grouped according to device, function, or category, as indicated by a tracking policy, the nature of the configuration change may be efficiently categorized based on signature changes detected in an interior node.

At 1216, the configuration management service initiates an action in response to the change. This may, for example, comprise notifying an administrator of the change. Since the managed computing environment may, in effect have two administrators—the provider of the managed computing environment, and the client of the provider—one of the two, or both, may be notified. In at least one embodiment, a corrective action is taken to restore the configuration setting to be within a support perimeter.

In an example embodiment, the process 1200 is implemented in a system comprising at least one processor and a memory that comprises executable instructions. The instructions, when executed by the at least one processor, cause the system to receive configuration data associated with a computing environment, and map the configuration data to a hierarchy of configuration items. The configuration data is mapped to the hierarchy based at least in part on a configuration tracking policy. Execution of the instructions further causes the system to generate a first signature of the hierarchy, where the first signature is generated based at least in part on a combination of signatures of configuration items of the hierarchy. Execution of the instructions further causes the system to identify a change to a configuration of the computing environment, based at least in part on comparison of the first signature to a second signature, initiate an action in response to the change to the configuration of the computing environment.

The example embodiment may be combined, in various ways, to form alternative embodiments.

In an aspect of an alternative embodiment, the generation of the first signature is based at least in part on information indicative of dynamism of one or more of the configuration items.

In another aspect, the generation of the first signature is based at least in part on information indicative of relevance of one or more of the configuration items to the configuration tracking policy.

In another aspect of an alternative embodiment, the memory comprises further instructions that, in response to execution by the at least one processor, cause the system at least to exclude, from the combination of signatures, a signature of a configuration item indicated by the configuration tracking policy to have at least one of high dynamism or low relevance.

In another aspect of an alternative embodiment, the memory comprises further computer-executable instructions that, in response to execution by the at least one processor, cause the system at least to generate a manifest comprising the hierarchy and a plurality of signatures corresponding to configuration items of the hierarchy.

In another aspect of an alternative embodiment, a configuration element is associated with at least one of an application program, database management system, network, operating system, storage device, or computing device.

In another aspect of an alternative embodiment, the action comprises restoring the configuration to be consistent with the configuration tracking policy.

This listing of alternative embodiments is not intended to be exclusive. For example, any of the various aspects just described may be combined, in further alternative embodiments, with any of the other various aspects. Moreover, some of the various aspects just described may be omitted from some alternative embodiments.

Figure 13:
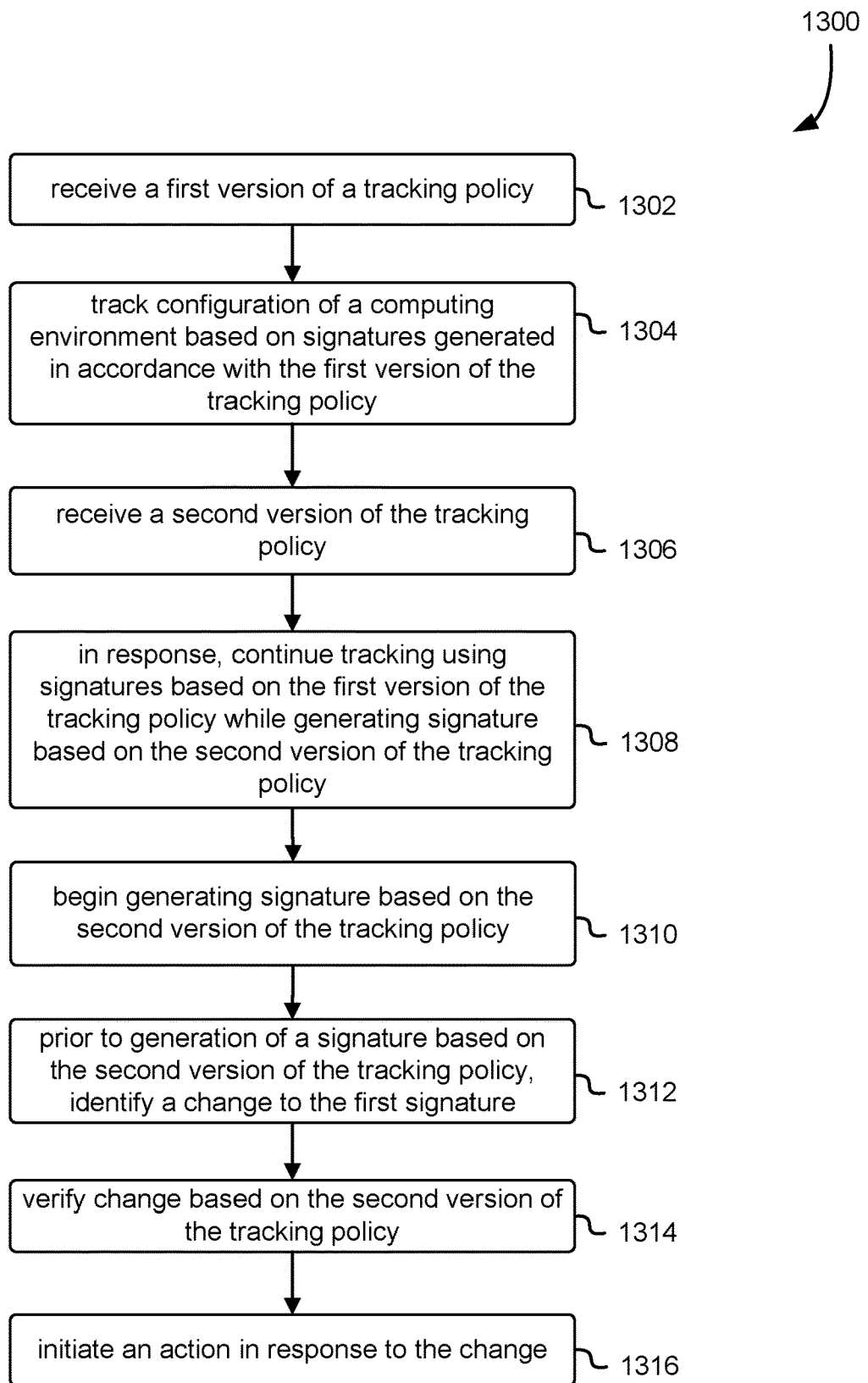
FIG. 13 illustrates tracking configuration of a computing environment using overlapping manifests, in accordance with at least one embodiment.

FIG. 13 illustrates tracking configuration of a computing environment using overlapping manifests, in accordance with at least one embodiment. Although FIG. 13 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 1300 that FIG. 13 depicts may be implemented on any of a variety of computing devices, such as by the configuration management service depicted in FIGS. 1 and 2.

At 1302, the configuration management service receives a first version of a tracking policy, and at 1304, the configuration management service tracks the configuration of a managed computing environment based on signatures generated in accordance with the policy. For example, as described in relation to FIG. 2, the configuration management service may periodically retrieve configuration data from the managed computing environment and recalculate the signatures in the hierarchy. Tracking the configuration in accordance with the first version of the tracking policy may therefore comprise comparing signatures generated using the hierarchy defined by the policy.

At 1306, the configuration management service receives a second, updated version of the tracking policy, and at 1308, responds to the receipt of the second version of the tracking policy. The response includes continuing to track the configuration of the managed computing environment based on signatures generated in accordance with the first version of the tracking policy. Meanwhile, at 1310, the configuration management service also begins to generate signatures based on the second version of the tracking policy. This may include retrieving any configuration that is not included as part of the prior tracking policy. Generating the updated signature may be a relatively lengthy process, since the new policy may require the acquisition of additional configuration data, in addition to generating new signatures for the tree. However, in some instances the efficiency of the operation may be improved by identifying an incorporating portions of the original signature hierarchy that are not affected by changes to the tracking policy. Also note that the signatures generated in accordance with the updated version of the policy would likely be different than those generated with the prior version.

At 1312, the configuration management service identifies a change to the configuration based on its tracking of the configuration in accordance with the first version of the tracking policy. This may occur prior to a signature being generated based on the updated tracking policy for the first time, such as while the signature based on the updated policy is being generated.

At 1314, the configuration management service verifies the change to determine if it is consistent with the second version of the tracking policy. This may comprise drilling down the configuration hierarchy associated with the first version of the tracking policy, to identify a changed setting, and determining whether that setting is also included in the second version of the tracking policy.

At 1316, the configuration management service initiates an action in response to the change. For example, the system may sent a notification to the provider of the managed computing environment, send a notification to a client of the provider, or take some other action.

In an example embodiment, the process 1300 is implemented in a system comprising at least one processor and a memory that comprises executable instructions. The instructions, when executed by the at least one processor, cause the system to receive a first version of a tracking policy for tracking a configuration of a computing environment. In response to receiving a second version of the tracking policy, the system continues to track the configuration of the computing environment in accordance with the first version of the tracking policy. The tracking is based on first signatures generated using the hierarchy defined by the first version. Meanwhile, the system begins to track the configuration of the computing environment in accordance with the second version of the tracking policy. During this period, the system may identify a change to the configuration of the computing environment, based at least in part a change to the first signatures. The system may then verify the change to the configuration using the second version of the tracking policy, and provide a notification of the change.

The example embodiment may be combined, in various ways, to form alternative embodiments.

In one aspect of an alternative embodiment, the generation of the second signatures comprises the collection of configuration data not used for generation of the first signatures.

In another aspect of an alternative embodiment, the memory comprises further computer-executable instructions that, in response to execution by the at least one processor, cause the system at least to discontinue tracking of the configuration of the computing environment in accordance with the first version of the tracking policy, when at least one of the second signatures has been generated.

In another aspect of an alternative embodiment, the memory comprises further computer-executable instructions that, in response to execution by the at least one processor, cause the system at least to determine to not send an additional notification in response to an additional change detected based at least in part on the first signatures, wherein the additional change is associated with a configuration item not used to generate the second signatures.

In another aspect of an alternative embodiment, the memory comprises further computer-executable instructions that, in response to execution by the at least one processor, cause the system at least to generate the second signatures based at least in part on hash values used to generate the first signatures.

In another aspect of an alternative embodiment, the memory comprises further computer-executable instructions that, in response to execution by the at least one processor, cause the system at least to generate the second signatures based at least in part on configuration data collected for use in generating the first signatures.

In another aspect of an alternative embodiment, the memory comprises further computer-executable instructions that, in response to execution by the at least one processor, cause the system at least to identify a changed configuration item based at least in part on a hierarchy of configuration signatures generated in accordance with the first version of the tracking policy. Further, the system verifies the change based at least in part on information indicative of the changed configuration item in the second version of the tracking policy.

In another aspect of an alternative embodiment, the second version of the tracking policy comprises information indicative of at least one of dynamism or relevance of the changed configuration item.

This listing of alternative embodiments is not intended to be exclusive. For example, any of the various aspects just described may be combined, in further alternative embodiments, with any of the other various aspects. Moreover, some of the various aspects just described may be omitted from some alternative embodiments.

Figure 14:
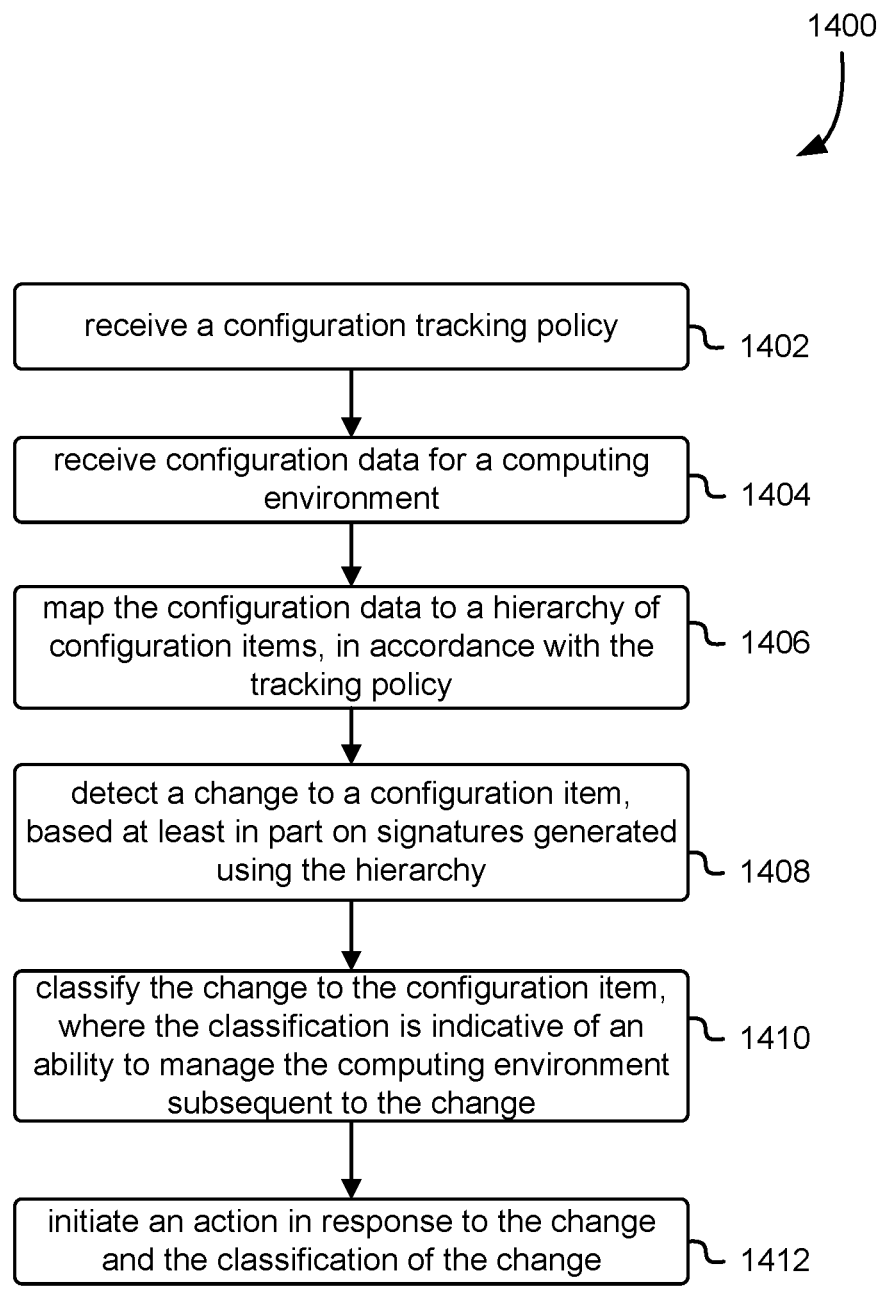
FIG. 14 illustrates tracking configuration of a computing environment in accordance with a support perimeter, in accordance with at least one embodiment.

FIG. 14 illustrates tracking configuration of a computing environment in accordance with a support perimeter, in accordance with at least one embodiment. Although FIG. 14 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 1400 that FIG. 14 depicts may be implemented on any of a variety of computing devices, such as by the configuration management service depicted in FIGS. 1 and 2.

At 1402, the configuration management service receives a configuration tracking policy. The configuration tracking policy may include information defining a support perimeter, as described in relation to FIG. 4.

At 1404, the configuration management service receives configuration data for a managed computing environment, and at 1406, maps the configuration data to a hierarchy of configuration items, in accordance with the tracking policy.

At 1408, the configuration management service detects a change to a configuration item, in the managed computing environment, based on the signatures generated using the hierarchy.

At 1410, the configuration management service classifies the change to the configuration item. The classification is indicative of the service's ability to manage the computing environment subsequent to the change to the configuration item. For example, the classification may indicate whether the change is beneficial, harmless, unsupported, detrimental to performance, and so on.

At 1412, the configuration management service initiates an action in response to the change and the classification of the change. In some cases—such as when the change is classified as beneficial or harmless—the action may be to simply provide a notification that the change was detected, or to record the change in a log. The action may also comprise determining to take no significant action. On the other hand, if the change is detrimental or unsupported, the action may be to issue a warning, or to begin a workflow that will correct the issue. In the latter case, the workflow, once completed, would bring the configuration of the managed computing environment to a point that is within the support perimeter.

In an example embodiment, the process 1400 is implemented in a system comprising at least one processor and a memory that comprises executable instructions. The instructions, when executed by the at least one processor, cause the system to receive configuration data associated with a computing environment, and map the configuration data to a hierarchy of configuration items. The configuration data is mapped in accordance with a configuration tracking policy. The system then detects, based at least in part on the hierarchy, a change to a configuration item, and determines a classification of the change. The classification is indicative of the system's ability to manage operations of the computing environment subsequent to the change to the configuration item. The system then initiates an action based on the classification.

The example embodiment may be combined, in various ways, to form alternative embodiments.

In one aspect of an alternative embodiment, the configuration tracking policy comprises information indicative of an association between the configuration item and the ability to manage operations of the computing environment.

In another aspect of an alternative embodiment, the configuration tracking policy comprises information indicating that the change to the configuration item is reversible.

In another aspect of an alternative embodiment, the configuration tracking policy comprises information indicating that the change to the configuration item affects performance.

In another aspect of an alternative embodiment, the classification is determined based at least in part on an effect, indicated by the configuration tracking policy, of the change to the configuration item on operation of the computing environment.

In another aspect of an alternative embodiment, the action comprises reversing the change to the configuration.

In another aspect of an alternative embodiment, the action comprising making an additional change to the configuration of the computing environment.

In another aspect of an alternative embodiment, the configuration item is mapped to the hierarchy of configuration items based at least in part on a configuration tracking policy.

This listing of alternative embodiments is not intended to be exclusive. For example, any of the various aspects just described may be combined, in further alternative embodiments, with any of the other various aspects. Moreover, some of the various aspects just described may be omitted from some alternative embodiments.

As one skilled in the art will appreciate in light of this disclosure, certain embodiments may be capable of achieving certain advantages, including some or all of the following. Various embodiments may provide improved granularity in detecting configuration changes. Further, various embodiments may provide improved continuity in tracking configuration changes when updating a tracking policy.

Various embodiments may also improve reliability of managed computing environments by regulating conformance to a support perimeter.

FIG. 15 illustrates aspects of an example system 1500 for implementing aspects in accordance with an embodiment. As will be appreciated, although a web-based system is used for purposes of explanation, different systems may be used, as appropriate, to implement various embodiments. In an embodiment, the system includes an electronic client device 1502, which includes any appropriate device operable to send and/or receive requests, messages, or information over an appropriate network 1504 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1506 for receiving requests and serving content in response thereto, although for other networks an alternative device serving a similar purpose could be used as would be apparent to one of ordinary skill in the art.

In an embodiment, the illustrative system includes at least one application server 1508 and a data store 1510, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1502 and the application server 1508, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1510, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1512 and user information 1516, which are used to serve content for the production side. The data store also is shown to include a mechanism for storing log data 1514, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1510.

The data store 1510, in an embodiment, is operable, through logic associated therewith, to receive instructions from the application server 1508 and obtain, update or otherwise process data in response thereto, and the application server 1508 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1502. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1500 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1500, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   memory comprising computer-executable instructions that, in response to execution by the at least one processor, cause the system at least to:
      receive configuration data associated with a computing environment;
      map the configuration data to a hierarchy of configuration items, the configuration data mapped in accordance with a configuration tracking policy;
      detect, based at least in part on the hierarchy of configuration items, a change to a configuration item;
      determine a classification of the change to the configuration item, the classification indicative of an ability to manage operations of the computing environment subsequent to the change to the configuration item; and
      initiate an action in response to the detected change, the action selected based at least in part on the classification.

2. The system of claim 1, wherein the configuration tracking policy comprises information indicative of an association between the configuration item and the ability to manage operations of the computing environment.

3. The system of claim 1, wherein the configuration tracking policy comprises information indicating that the change to the configuration item is reversible.

4. The system of claim 1, wherein the classification is determined based at least in part on an effect, indicated by the configuration tracking policy, of the change to the configuration item on operation of the computing environment.

5. The system of claim 1, wherein the action comprises making an additional change to the configuration of the computing environment, wherein the additional change causes a configuration setting of the computing environment to correspond to at least one of a pre-defined set of configuration settings.

6. A computer-implemented method, comprising:
   mapping configuration data associated with a computing environment to a hierarchy of configuration items, the configuration data mapped in accordance with a configuration tracking policy;
   detecting, based at least in part on the hierarchy of configuration items, a change to a configuration item;
   determining a classification of the change to the configuration item, the classification indicative of an ability to manage operations of the computing environment subsequent to the change to the configuration item; and
   initiating an action based at least in part on the classification.

7. The computer-implemented method of claim 6, wherein the configuration tracking policy comprises information indicative of an association between the configuration item and the ability to manage operations of the computing environment.

8. The computer-implemented method of claim 6, wherein the configuration tracking policy comprises information indicating that the change to the configuration item is reversible.

9. The computer-implemented method of claim 6, wherein the configuration tracking policy comprises information indicating that the change to the configuration item affects at least one of performance, throughput, or latency.

10. The computer-implemented method of claim 6, wherein the classification is determined based at least in part on an effect, indicated by the configuration tracking policy, of the change to the configuration item on operation of the computing environment.

11. The computer-implemented method of claim 6, wherein the action comprises at least one of compensating for the change to the configuration or reversing the change to the configuration.

12. The computer-implemented method of claim 6, wherein the action comprising making an additional change to the configuration of the computing environment.

13. The computer-implemented method of claim 6, wherein the configuration item is mapped to the hierarchy of configuration items based at least in part on a configuration tracking policy.

14. A non-transitory computer-readable storage medium having stored thereon instructions that, upon execution by one or more computing devices, cause the one or more computing devices at least to:

mapping configuration data associated with a computing environment to a hierarchy of configuration items, the configuration data mapped in accordance with a configuration tracking policy;

detecting, based at least in part on the hierarchy of configuration items, a change to a configuration item;

classifying the change to the configuration item, the classification indicative of an ability to manage operations of the computing environment subsequent to the change to the configuration item; and initiating an action based at least in part on the classification.

15. The non-transitory computer-readable storage medium of claim 14, wherein the configuration tracking policy comprises information indicative of an association between the change to the configuration item and the ability to manage operations of the computing environment.

16. The non-transitory computer-readable storage medium of claim 14, wherein the configuration tracking policy comprises information indicating that the change to the configuration item is reversible.

17. The non-transitory computer-readable storage medium of claim 14, wherein the configuration tracking policy comprises information indicating that the change to the configuration item affects at least one of performance, throughput, or latency.

18. The non-transitory computer-readable storage medium of claim 14, wherein the classification is determined based at least in part on an effect, indicated by the configuration tracking policy, of the change to the configuration item on operation of the computing environment.

19. The non-transitory computer-readable storage medium of claim 14, wherein the action comprises at least one of reversing or compensating for the change to the configuration.

20. The non-transitory computer-readable storage medium of claim 14, wherein the configuration item is mapped to the hierarchy of configuration items based at least in part on a configuration tracking policy.

\* \* \* \* \*